P. CROMER.
Rolling-Pin.

No. 220,702.                    Patented Oct. 21, 1879.

UNITED STATES PATENT OFFICE.

PHILIP CROMER, OF BOSTON, MASSACHUSETTS.

IMPROVEMENT IN ROLLING-PINS.

Specification forming part of Letters Patent No. 220,702, dated October 21, 1879; application filed September 9, 1878.

*To all whom it may concern:*

Be it known that I, PHILIP CROMER, of Boston, in the county of Suffolk and State of Massachusetts, have invented a new and useful Improvement in Rolling-Pins, of which the following is a specification.

My invention consists of a rolling-pin for bread and pastry, composed of a glass cylinder made hollow, thicker at the ends than at the center, through which passes a spindle longitudinally, provided at each end with a handle, and so constructed that while the cylinder is rotating when in use, the handles may be grasped and firmly held without turning.

Figure 1:
Figure 2:
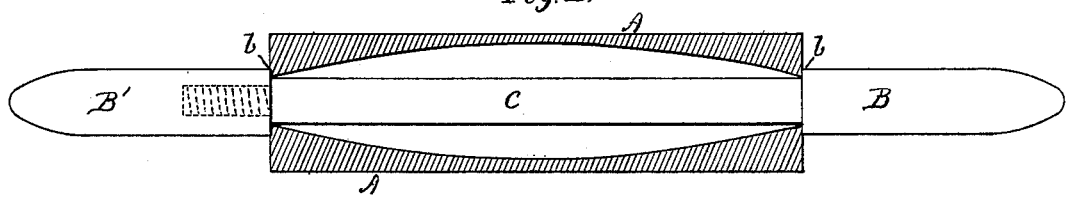

Referring to the drawings, Figure 1 represents an elevation of my improved rolling-pin, and Fig. 2 is a longitudinal section of the same.

A represents a glass cylinder made hollow inside and thicker at the ends than at the center, so as to combine strength with the required lightness. Passing longitudinally through the cylinder is a spindle, C, having a handle, B, at one end, forming a portion of the spindle, and at the other end is a handle, B', connected to the spindle C by means of a mortise, screw, or other suitable device. The handles may consist of sleeves properly secured to the spindle, which may extend through the handles.

The diameter of the handles is larger than that of the openings at the ends of the cylinder, so as to form shoulders b, having a bearing upon the cylinder.

The ends of the cylinder are designed to be rounded off, so as to render them less liable to chip off the edges.

The cylinders are to be blown and subjected to an annealing process, by which they are rendered very tough, and not liable to break, even if subjected to hard usage.

It is well known that it is necessary sometimes to make pastry-dough with very cold or ice water, and that such dough should be rolled on a cold board or cold stone slab. In order to have the rolling-pin also cold, the handle B' may be taken off and the spindle C removed, and the cylinder supplied with ice or a cooling mixture. The spindle may then be reinserted, and the handle B' replaced.

By removing the handle and spindle, the interior of the cylinder may be cleaned, as required.

Heating matter, such as hot water, may be similarly applied to the rolling-pin, if needed.

The ends of the cylinder may be thickened, as shown, or otherwise constructed, to afford a solid bearing for the spindle, and provided with shoulders, as at b, for the handles.

The great objection to the ordinary wooden roller consists in the sticking of the dough or pastry to the same when in use, thus rendering the process of rolling unpleasant and wearisome. This difficulty is obviated by the use of glass as a roller, as the dough or pastry is not liable to adhere to it, and a much better effect is produced upon the substance rolled.

Glass bottles have been used for rolling dough, &c., the neck serving as a handle; but this was an awkward device, and not available for constant use.

I am aware that a rolling-pin made of glass with contracted ends to form handles has also been used, but the handles being a part of the roller, and rotating with the same when in use, render their use objectionable, as the friction upon the hands is liable to blister the same.

By my improvement, the handles can be firmly held without liability of blistering the hands, and any required amount of pressure may be exerted upon the roller and the substance rolled.

I am also aware that rolling-pins have been made of cement compositions, surrounding a central spindle, to which the handles are applied, the roller, the spindle, and the handles being so connected that the several parts turn together, as in the ordinary wooden pin.

I am also aware that it is old to make a wooden core covered with a metal plate bearing designs, through which core is loosely passed a spindle having a handle on one end made with it, and the handle on the other end fixed to such spindle after it has been passed through the core, the core turning upon the spindle, and the whole serving as a rolling-pin.

I do not claim a rolling-pin made of glass, nor one of cement composition; but

What I do claim as my invention is—

The rolling-pin described, consisting of the glass cylinder provided centrally of its ends with bearings, the spindle passing through said bearings and cylinder loosely, to permit of the rotation of the cylinder upon said spindle, the fixed handle and the removable handle, all combined to operate substantially as specified.

In testimony whereof I have signed my name to this specification in the presence of two subscribing witnesses.

PHILIP CROMER.

Witnesses:
J. H. ADAMS,
T. F. LALLY.